United States Patent
Tesch et al.

(10) Patent No.: US 9,643,664 B2
(45) Date of Patent: May 9, 2017

(54) UNDERBODY PANELLING PART OF WHEEL AXLE AND SUBASSEMBLY COMPRISING AN UNDERBODY PANELLING PART

(71) Applicant: Bayerische Motoren Werke Aktiengesellschaft, Munich (DE)

(72) Inventors: Gregor Tesch, Garching (DE); Markus Kohlhuber, Schweitenkirchen (DE); Rasmus Leicht, Eching (DE); Roland Schmidt, Stockdorf (DE); Hubert Scholz, Munich (DE); Matthias Hennig, Munich (DE); Ludwig Seethaler, Hebertshausen (DE); Roland Koenig, Habach (DE); Markus Fauser, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/061,022

(22) Filed: Mar. 4, 2016

(65) Prior Publication Data

US 2016/0257353 A1    Sep. 8, 2016

Related U.S. Application Data

(63) Continuation of application No. PCT/EP2014/068261, filed on Aug. 28, 2014.

(30) Foreign Application Priority Data

Sep. 24, 2013    (DE) .......................... 10 2013 219 211

(51) Int. Cl.
*B62D 35/02* (2006.01)
*B60G 7/00* (2006.01)

(52) U.S. Cl.
CPC ............. *B62D 35/02* (2013.01); *B60G 7/001* (2013.01); *B60G 2204/40* (2013.01); *B60G 2204/4308* (2013.01); *B60G 2206/10* (2013.01)

(58) Field of Classification Search
CPC .... B62D 35/02; B60G 7/001; B60G 2204/40; B60G 2204/4308; B60G 2206/10
See application file for complete search history.

(56) References Cited

U.S. PATENT DOCUMENTS

| 2011/0309652 A1* | 12/2011 | Eichentopf | ............ B60G 7/001 296/180.1 |
| 2015/0048648 A1* | 2/2015 | Wolf | ...................... B62D 35/02 296/180.5 |

(Continued)

FOREIGN PATENT DOCUMENTS

| DE | 10 2010 004 532 A1 | 8/2010 |
| DE | 10 2010 018 779 A1 | 11/2010 |

(Continued)

OTHER PUBLICATIONS

German Search Report issued in counterpart German Application No. 10 2013 219 211.8 dated Oct. 11, 2016 with partial English translation (12 pages).

(Continued)

*Primary Examiner* — Drew Brown
(74) *Attorney, Agent, or Firm* — Crowell & Moring LLP

(57) ABSTRACT

An underbody panelling part of a wheel axle near the wheelhouse of a motor vehicle includes a substantially flat main part, a first mounting point provided on the main part, which first mounting point can be rotatably connected to a transverse link of the motor vehicle, and a second mounting point provided on the main part, which second mounting point can be coupled to a wheel carrier or a steering rod. The underbody panelling part can be pivoted about the first (Continued)

mounting point when the wheel carrier is pivoted. A subassembly having the underbody panelling part is also provided.

11 Claims, 2 Drawing Sheets

(56) References Cited

U.S. PATENT DOCUMENTS

| | | | | |
|---|---|---|---|---|
| 2016/0096409 A1* | 4/2016 | Bromme | ............... | F16D 65/128 |
| | | | | 280/124.134 |
| 2016/0185402 A1* | 6/2016 | Tesch | ..................... | B62D 35/02 |
| | | | | 280/788 |
| 2016/0280284 A1* | 9/2016 | Scholz | ................... | B62D 35/02 |

FOREIGN PATENT DOCUMENTS

| | | |
|---|---|---|
| FR | 2 961 468 A1 | 12/2011 |
| JP | 2010-132208 A | 6/2010 |

OTHER PUBLICATIONS

International Search Report (PCT/ISA/210) issued in PCT Application No. PCT/EP2014/068261 dated Nov. 26, 2014 with English translation (five pages).
German-language Written Opinion (PCT/ISA/237) issued in PCT Application No. PCT/EP2014/068261 dated Nov. 26, 2014 (six pages).
Chinese Office Action issued in counterpart Chinese Application No. 201480046874.9 dated Nov. 4, 2016 with English translation (nine pages).

* cited by examiner

UNDERBODY PANELLING PART OF WHEEL AXLE AND SUBASSEMBLY COMPRISING AN UNDERBODY PANELLING PART

CROSS REFERENCE TO RELATED APPLICATIONS

This application is a continuation of PCT International Application No. PCT/EP2014/068261, filed Aug. 28, 2014, which claims priority under 35 U.S.C. §119 from German Patent Application No. 10 2013 219 211.8, filed Sep. 24, 2013, the entire disclosures of which are herein expressly incorporated by reference.

This application contains subject matter related to U.S. application Ser. No. 15/061,064, entitled "Underbody Panelling Part of Wheel Axle and Subassembly Comprising an Underbody Panelling Part" filed on Mar. 4, 2016.

BACKGROUND AND SUMMARY OF THE INVENTION

The invention relates to an underbody panelling part of a wheel axle in the region of the wheel arch of a motor vehicle, and to a subassembly having an underbody panelling part of said type.

Against the background of the discussion regarding the reduction of $CO_2$ emission of motor vehicles, measures for reducing fuel consumption play an ever greater role. These include, inter alia, the lowering of the air resistance of the vehicle. Whereas optimum solutions have long been sought in the case of vehicle body design, the reduction of the air resistance of the underbody of the vehicle has still not advanced very far. Here, however, there is major potential for improvement, because the underbody, after all, can account for approximately 20% of the overall air resistance.

In the region of the front axle with the steerable wheels, the particular challenge is to realize an underbody panelling which allows for the variable wheel position.

In this regard, DE 10 2010 018 779 A1 has proposed, generally, that a panelling part be held on the motor vehicle so as to be movable in a manner dependent on a pivoting movement of a link element. The manner of attachment is, however, not specified.

It is an object of the invention to provide an inexpensive underbody panelling part which can be easily arranged, in the region of a wheel axle, in the wheel arch, and which can realize an effective reduction in air resistance.

For this purpose, an underbody panelling part of a wheel axle in the region of the wheel arch of a motor vehicle is formed with a substantially plate-like main body. A first bearing point is provided which is formed on the main body and which can be rotatably connected to a transverse link of the motor vehicle, and a second bearing point is provided which is formed on the main body and which can be coupled to a wheel carrier or to a steering rod, such that the panelling part can be pivoted about the first bearing point with a pivoting movement of the wheel carrier. The rotatable connection to the transverse link serves to realize a pivot point which is situated very close to the center of rotation of the wheel carrier, such that the pivoting of the underbody panelling part follows the pivoting of the wheel carrier as closely as possible. In this way, the formation of excessively large gaps is prevented. The pivoting movement required for following the steering movement is transmitted to the panelling part via the second bearing point by a component which performs the steering movement, specifically the wheel carrier or the steering rod.

The underbody panelling part is preferably composed of a lightweight, rigid material which is weather-resistant and which is not sensitive to shocks, for example a fiber-reinforced plastics material.

The invention also relates to a subassembly having an underbody panelling part according to the invention. The subassembly furthermore includes a pendulum rod by which the second bearing point is connected to the wheel carrier or to the steering rod.

The pendulum rod may be mounted at both sides by way of ball joints.

As an alternative to this, the subassembly according to the invention provides that a rigid connection is provided, by way of which the second bearing point is connected to the wheel carrier or to the steering rod.

It is also contemplated for a variable-length connection to be provided between the underbody panelling part and the wheel carrier in order, in the event of collisions with adjacent components, for example in extreme positions of the steering system or in the event of constriction of the wheel arch as a result of severe fouling, ice or snow deposits, to realize a compensatory clearance for the underbody panelling part. The connection between the underbody panelling part and the wheel carrier could, for example, be designed to be elastically flexible under pressure and/or under tension.

At the first bearing point, there is preferably provided a rotary joint which, in the installed state, connects the underbody panelling part to the transverse link. It has been found to be sufficient for only a rotational degree of freedom to be provided at this location.

The rotary joint is preferably a sealed rotary plain bearing, composed for example of a suitable plastic.

The positioning of the articulation points on the underbody panelling part and on the wheel carrier and/or the steering rod is performed with the aim of minimizing a relative movement of the underbody panelling part relative to the articulated and spring-mounted wheel. By means of the pendulum rod, the angular movements can be distributed in balanced fashion across all kinematic states, such that no excessive relative angles arise in relation to the initial state during straight-ahead travel and relative to the adjacent components.

A gap that necessarily arises between the underbody panelling part and adjacent components can be covered through the fitting of a flexible material, for example a brush seal.

The underbody panelling part may also have the effect of at least partially sealing off the wheel arch region against the ingress or emergence of air flows.

The underbody panelling part preferably has an upwardly curved edge situated at the front in the vehicle longitudinal direction. The curved geometry reliably prevents the possibility of an air flow exerting a force on the underbody panelling part from above.

If, in the case of wheel arches through which cooling air flows, it is necessary to ensure good ventilation of the wheel arch, the underbody panelling part may, optionally, at its end directed toward the vehicle rear end, delimit an air duct which is oriented substantially horizontally. The air duct permits an outflow of air from the wheel arch in a substantially horizontally directed air stream without turbulence, which turbulence would otherwise increase the air resistance.

The optional air duct may be formed by a gap between the underbody panelling part and an adjacent vehicle body section, through which gap the air can flow in parallel along the underbody of the vehicle.

Through the provision of an underbody panelling part of this type, it is possible for the ram lip provided in the region of the front of the vehicle, or a ram body arranged there, to be decreased in size or omitted entirely.

The overall geometry of the underbody panelling part may be adapted by a person skilled in the art to the geometry of the wheel arch region and the required free travel of the underbody panelling part in all potential operating states and driving states.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
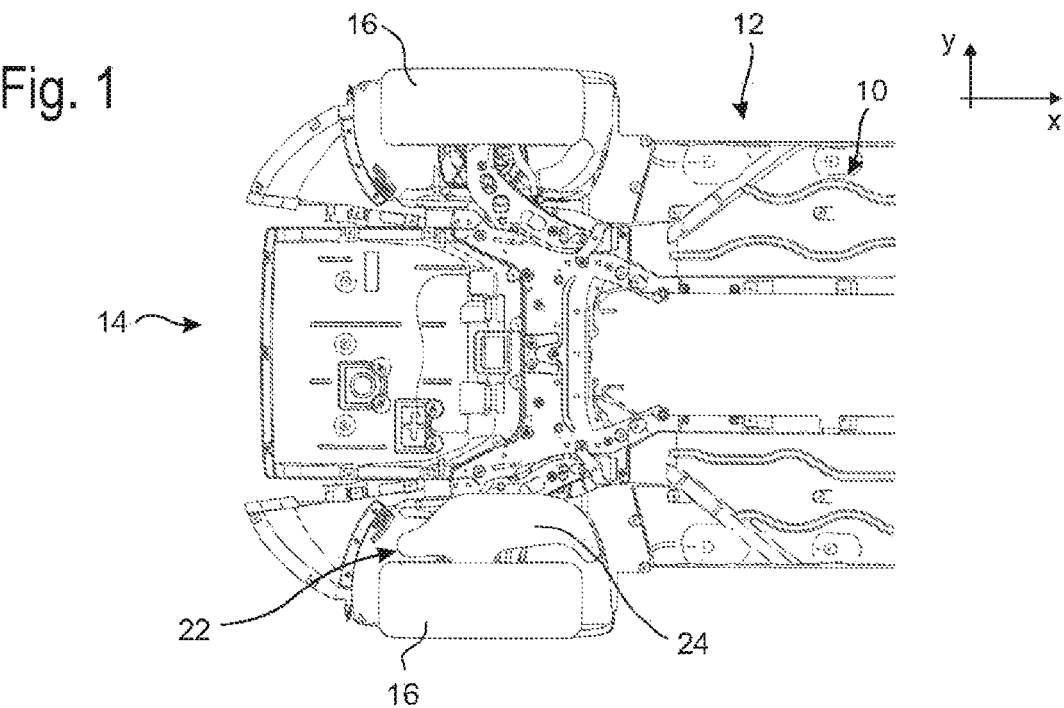
FIG. 1 is a schematic view of an underbody of a vehicle having a subassembly with an underbody panelling part according to an embodiment of the invention.
Figure 2:
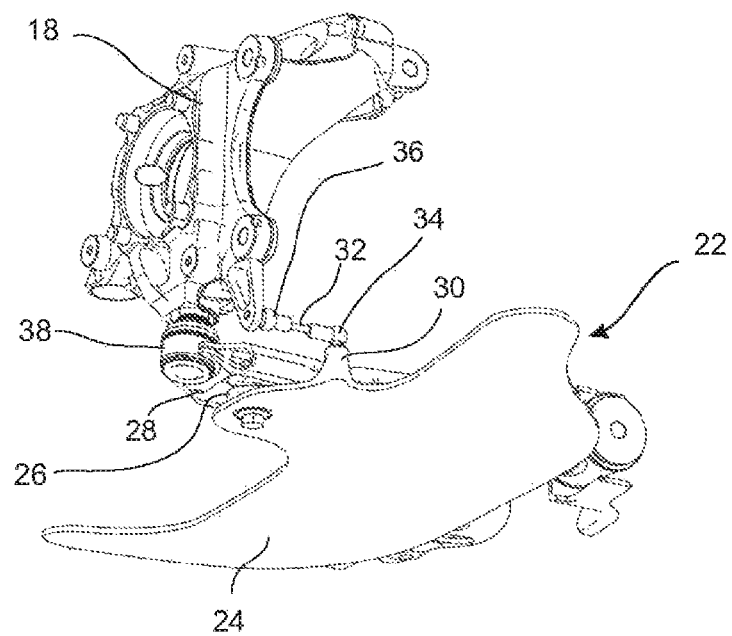
FIG. 2 is a schematic perspective view of the subassembly with an underbody panelling part according to the embodiment of the invention.

FIG. 1 shows an underbody 10 of a motor vehicle 12 in the region of a front end 14 of the motor vehicle 12. Arranged on a front wheel axle are the two front wheels 16, which are each fastened in a known manner to a wheel carrier 18 (see FIG. 2).

In the region of the wheel arch 20 there is arranged an underbody panelling part 22, which covers the components of the wheel suspension from below.

The underbody panelling part 22 has a substantially plate-like main body 24.

On the main body 24 there is formed a first bearing point 26, which permits a connection to a transverse link 28 of the vehicle 12. A second bearing point 30, which is formed on the main body 24 at a distance from the first bearing point 26 and which protrudes in relation to the surface of the main body 24, permits a connection to the wheel carrier 18. It is alternatively also possible for a connection to a steering rod of the vehicle 12 to be produced by way of the second bearing point 30.

The panelling part 22, with its fastening devices (discussed below) for attachment to wheel suspension parts, may form a subassembly together with the parts to which it is fastened.

The connection between the first bearing point 26 and the transverse link 28 is realized by way of a sealed rotary plain bearing composed of a suitable plastic, which permits a rotational movement about a single axis of rotation.

The connection of the underbody panelling part 22 to the wheel carrier 18 by way of the second bearing point 30 for the transmission of a steering movement or of other movements of the wheel carrier 18 is realized here by way of a pendulum rod 32, which is articulatedly connected, by way of a ball joint 34, 36 on both sides, to the second bearing point 30 and to the wheel carrier 18, respectively. The second bearing point 30 is in this case formed as a seat of the ball joint 34 of the pendulum rod 32.

Via the pendulum rod 32, any movement of the wheel carrier 18 or of the steering rod can be transmitted and converted into a pivoting movement of the underbody panelling part 22 about the axis of rotation predefined by the rotary plain bearing of the first bearing point 26.

It would alternatively also be possible for the second bearing point 30 to be rigidly connected to the wheel carrier 18 or to the steering rod.

The connection of the first bearing point 26 to the transverse link 28 is situated as close as possible to a center of rotation 38 of the wheel carrier 18 with respect to the transverse link 28, in order that the underbody panelling part 22 can follow the steering movement as identically as possible, and in order to prevent the formation of excessively large gaps.

The gaps that nevertheless imperatively exist between the underbody panelling part 22 and adjacent components can be covered by way of brush seals (not illustrated) along the edge of the panelling part 22. The brush seal may also be fitted along a static component, for example along the wheel arch 20 or the underbody.

Figure 3:
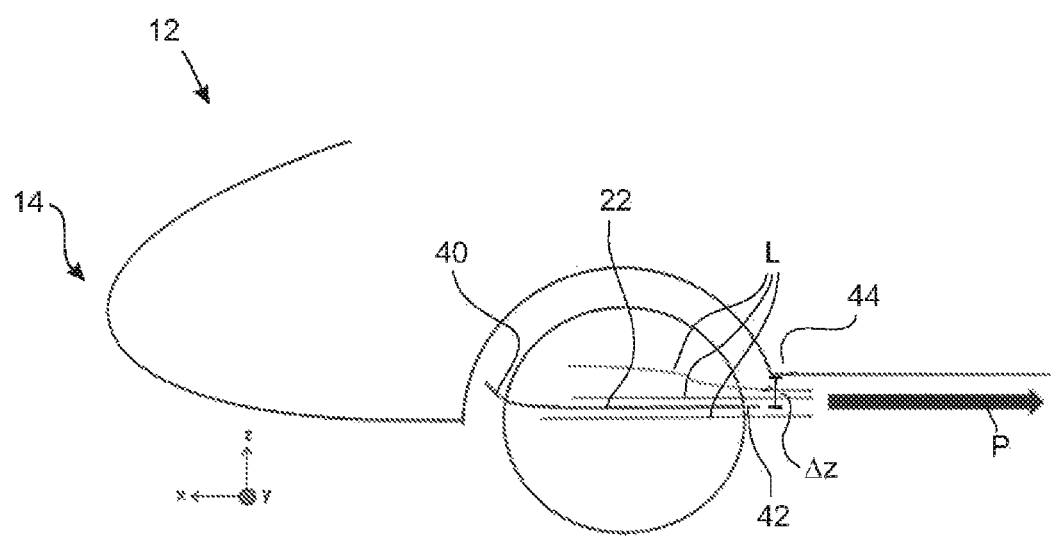
FIG. 3 is a schematic sectional view of the front of a vehicle, illustrating the air flows in the region of an underbody panelling part according to the embodiment of the invention.

FIG. 3 shows that the underbody panelling part 22 has an upwardly curved front edge 40 at its front end. The curvature extends preferably over the entire front edge of the underbody panelling part 22, and serves for diverting the air flow along the underbody 10 in such a way that the air flow cannot act on the underbody panelling part 22 from above.

The air flow that forms along and below the underbody panelling part 22 is denoted in FIG. 3 by the arrow L. It can be seen that the air flows along, substantially without turbulence, parallel to the horizontal profile of the main body 24 of the underbody panelling part 22. The arrows K show the cooling air flow from the interior of the wheel arch 20.

Between the rear end 42 of the underbody panelling part 22 and a section 44 of the adjacent vehicle body or vehicle panelling which adjoins the wheel arch 20 in the longitudinal direction, there is formed, in this example, an air gap with the vertical height Δz, such that an air duct is formed between the underbody panelling part 22 and the section 44 of the vehicle body. This air duct allows the air flowing out of the wheel arch 20 to flow off parallel to the underbody of the vehicle 12 (see arrow P in FIG. 3). Turbulence and thus increased air resistance are prevented in this way.

The entire underbody panelling part 22 including the first and second bearing points 26, 30 that are, for example, formed thereon, is in this case manufactured from a fiber-reinforced plastics material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An underbody paneling part of a wheel axle in a region of a wheel arch of a motor vehicle, comprising:
a substantially plate-shaped main body having first and second bearing points formed thereon, wherein
the first bearing point is configured to be rotatably connected to a transverse link of the motor vehicle,
the second bearing point is configured to be coupleable to a wheel carrier or a steering rod of the motor vehicle, the substantially plate-shaped main body is pivotable about the first bearing point with a pivoting movement of the wheel carrier of the motor vehicle.

2. A subassembly of a wheel axle of a motor vehicle, comprising:
an underbody panelling part having a substantially plate-shaped main body with first and second bearing points being formed on the substantially plate-shaped main body;
a transverse link of the motor vehicle;
a wheel carrier or a steering rod of the motor vehicle;
wherein the first bearing point of the substantially plate-shaped main body is rotatably connected to the transverse link of the motor vehicle and the second bearing point is coupled to the wheel carrier or the steering rod, and
wherein the underbody panelling part is pivotable about the first bearing point when the wheel carrier is pivoted.

3. The subassembly according to claim 2, further comprising a pendulum rod connecting the second bearing point of the substantially plate-shaped main body to the wheel carrier or the steering rod.

4. The subassembly according to claim 3, wherein the pendulum rod is mounted at both sides via ball joints.

5. The subassembly according to claim 2, wherein the second bearing point is rigidly connected to the wheel carrier or the steering rod.

6. The subassembly according to claim 2, wherein, at the first bearing point, a rotary joint is provided that connects the underbody panelling part to the transverse link.

7. The subassembly according to claim 6, wherein the rotary joint is a sealed rotary plain bearing.

8. The subassembly according to claim 2, further comprising a brush seal arranged to cover a gap between the underbody panelling part and an adjacent component.

9. The subassembly according to claim 2, wherein the substantially plate-shaped main body has an upwardly curved edge arranged at a front end thereof in a longitudinal direction of the motor vehicle.

10. The subassembly according to claim 2, wherein the underbody panelling part delimits, at an end thereof directed toward a rear end of the vehicle, an air duct oriented substantially horizontally.

11. The subassembly according to claim 10, wherein the air duct is defined by a gap formed between the underbody panelling part and an adjacent vehicle body section.

* * * * *